United States Patent
Hsu et al.

(10) Patent No.: US 6,980,824 B2
(45) Date of Patent: Dec. 27, 2005

(54) METHOD AND SYSTEM FOR OPTIMIZING TRANSMISSION AND RECEPTION POWER LEVELS IN A COMMUNICATION SYSTEM

(75) Inventors: Louis L. Hsu, Fishkill, NY (US); Brian L. Ji, Fishkill, NY (US); Karl D. Selander, Hopewell Junction, NY (US); Michael A. Sorna, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 10/249,546

(22) Filed: Apr. 17, 2003

(65) Prior Publication Data
US 2004/0209635 A1   Oct. 21, 2004

(51) Int. Cl.[7] ................................................. H04B 7/00
(52) U.S. Cl. .......................... 455/522; 455/69; 375/358
(58) Field of Search .................. 455/69, 522; 375/146, 375/147, 358

(56) References Cited

U.S. PATENT DOCUMENTS

| | | | |
|---|---|---|---|
| 4,910,791 A | 3/1990 | Dickinson et al. | |
| 5,157,697 A | 10/1992 | Anvari et al. | |
| 6,263,077 B1 | 7/2001 | Zuranski et al. | |
| 6,333,639 B1 | 12/2001 | Lee | |
| 6,335,923 B2 * | 1/2002 | Kubo et al. | 370/335 |
| 6,369,636 B1 | 4/2002 | Li | |
| 6,385,252 B1 | 5/2002 | Gradl et al. | |
| 6,615,052 B1 * | 9/2003 | Parmenter | 455/522 |
| 2001/0023188 A1 * | 9/2001 | Komatsu | 455/522 |
| 2002/0115462 A1 * | 8/2002 | Hottinen | 455/522 |
| 2003/0203742 A1 * | 10/2003 | D'Souza et al. | 455/522 |

* cited by examiner

Primary Examiner—Nguyen T. Vo
Assistant Examiner—Nhan T. Le
(74) Attorney, Agent, or Firm—Daryl Neff (57) ABSTRACT

A method and system are disclosed herein for determining optimum power level settings for a transmitter and receiver pair of a communication system having a plurality of transmitter and receiver pairs, as determined with respect to bit error rate. In the method disclosed herein, the power levels of a transmitter and a receiver pair coupled to communicate over a duplex communication link are set to initial values. The bit error rate is then determined over the link. Then, the power level of the transmitter, the receiver, or both, is altered, incrementally, and the effect upon the bit error rate is determined. When an improvement appears in the bit error rate at an altered power level, the power level of the transmitter, the receiver or both, are set to the altered power level at which the improvement is found. The steps of incrementally altering power levels, determining the bit error rate, and establishing new power level settings when there is an improvement are repeated until power levels are determined at which the bit error rate is optimized.

18 Claims, 8 Drawing Sheets

METHOD AND SYSTEM FOR OPTIMIZING TRANSMISSION AND RECEPTION POWER LEVELS IN A COMMUNICATION SYSTEM

BACKGROUND OF INVENTION

The present invention relates to communication systems, and more specifically to a method and system for setting and adjusting transmission and reception power levels in a communication system.

In today's high-speed communication systems, point-to-point serial links are being used increasingly, in place of traditional shared buses. Point-to-point serial links have advantages over shared buses; for example high availability, lack of collisions, etc., but such serial links are sometimes less desirable in advanced systems with complex architecture. This is because in systems having point-to-point serial links, performance deteriorates when a large number of components are packed onto a chip. Power consumption and data integrity suffer greatly in these situations, posing concerns for overall system performance. The power and reception challenges are closely coupled and have to be addressed cohesively, as will be understood in the following.

Conventionally, transmission and reception power is fixed to each chip at the design stage. This is a good approach for chips coupled to few links. However, as more components are packed into chips, more power is consumed and more interface noise is generated, much of it due to cross coupling (cross talk) between signals carried by closely situated conductors. In order to illustrate some of these concerns and challenges, FIG. 1 provides an example of a network system 10, such as may exist in the prior art.

Figure 1:
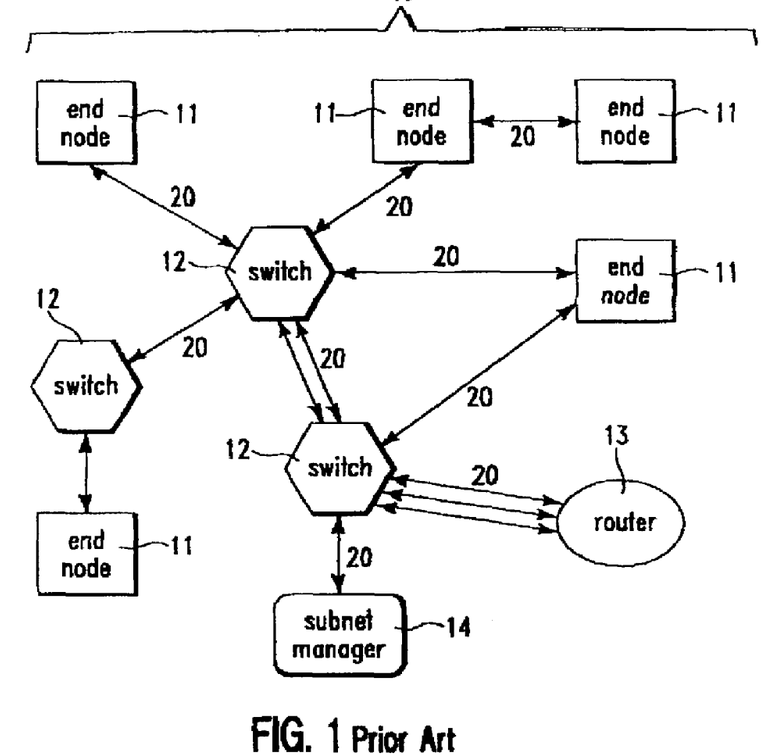
FIG. 1 illustrates a prior art point-to-point network system.

The prior art network system 10 provided in FIG. 1 has a point-to-point link structure. This network system 10 includes end nodes 11, switches 12, one or more routers 13, sub-net managers 14, and links 20. The network system 10 of FIG. 1 is depicted for illustrative purposes only. Other point-to-point network systems may contain more, less or different components, even though the challenges remain substantially the same.

Figure 2:
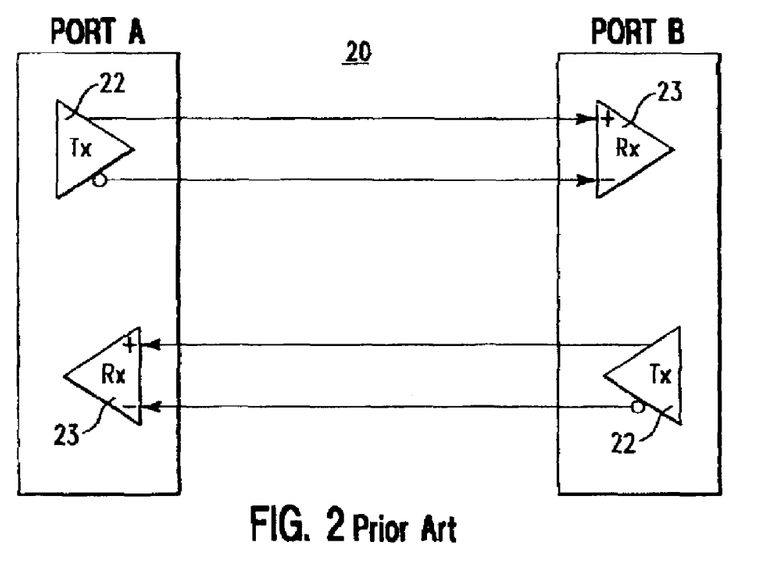
FIG. 2 illustrates port-to-port linkage details of the prior art system shown in FIG. 1.

Any of the links 20 in FIG. 1 represents a full duplex transmission path. A duplex transmission path provides for two-way communication between components that are linked together. Links 20 are provided to connect, directly or indirectly, any two components in network system 10. The components depicted in FIG. 1 may be either nodes or fabric-elements (e.g. end nodes 11, switches 12, router 13, and links 20) of the network system 10. Each node includes one or more ports for communicating over one or more links. FIG. 2 provides a more detailed prior-art illustration of link connections made between ports.

As illustrated In FIG. 2, in a duplex serial communication link 20, port-to-port communication is provided over a pair of one-way links carrying high-speed-low voltage differential signals (LVDS) from a transmitter TX 22 to a receiver RX 23. For example, the transmitter 22 of port A sends a signal to the receiver 23 of port B over a first one-way link of the duplex communication path. Over a second one-way link transmitter 22 of port B sends a signal to the receiver 23 of port A, either at a different time, or simultaneously.

One way of analyzing the performance of such communication system is through an eye diagram of the LVDS bit streams that are sent from a transmitter to receiver therein. An eye diagram can be defined as a time domain data valid window of the generated bit streams transmitted between the driver and the receiver at any one time. The signals transmitted from the transmitter to receiver are subjected to jitter, attenuation and other interference, which affect the ability to receive the data they represent. The greater these sources of interference and attenuation, the smaller the eye of the diagram becomes. Consequently, it becomes very important to address and correct these sources of interference.

One way of increasing the signal-to-noise ratio in such systems is by equalization methods. In general, such methods operate by increasing the emphasis of the system on certain high frequency components of the signal. Some equalization methods involve complex digital signal processing. The implementation of an equalization method, however, is difficult and requires high power consumption. In addition, the equalization method itself may contribute to noise. Equalization methods are therefore undesirable in an environment in which power consumption is already at issue. To complicate the problem further, in a densely packed chip, cross coupling interference (cross-talk) between elements, such as transmitters and receivers, poses a significant challenge. Unless cross coupling interference is addressed specifically, any attempt to improve signal quality, for example, by use of an equalization method, may lead to diminished signal-to-ise ratio.

Signal strength of a driver, the part of the transmitter that drives output signal levels on a signal line, is directly related to the power allocated to the driver. Receiver sensitivity is directly related to the power allocated to the receiver. An increase in the driver power of a transmitter leads to an increase in the signal strength of the transmitted signals. However, such increase can create more cross-talk noise, coupled (i.e. by capacitive and/or inductive coupling) to a receiver that is spatially close to, but not in communication with the particular transmitter. The receiver sensitivity also depends on channel properties, which cannot be neglected. Because the channel length and properties may vary from one link to another link, in an advanced system in which each chip has multiple receiver/driver pairs, a systematic approach is required to find optimum operating power levels.

Consequently, a new method and system are sought to optimize performance, in terms of bit error rate, of a communication system, by optimizing power levels to which a transmitter and a receiver pair of the communication system are set.

SUMMARY OF INVENTION

Accordingly, the present invention provides for a method and system for determining optimum power level settings for a transmitter and receiver pair of a communication system having a plurality of transmitter and receiver pairs, as determined with respect to bit error rate. In the method provided, the power levels of a transmitter and a receiver pair coupled to communicate over a duplex communication link are set to initial values. The bit error rate is then determined over the link. Then, the power level of the transmitter, the receiver, or both, is altered, incrementally, and the effect upon the bit error rate is determined. When an improvement appears in the bit error rate at an altered power level, the power level of the transmitter, the receiver or both, are set to the altered power level at which the improvement is found. The steps of incrementally altering power levels, determining the bit error rate, and establishing new power level settings when there is an improvement are repeated until power levels are determined at which the bit error rate is optimized.

DETAILED DESCRIPTION

Figure 3:
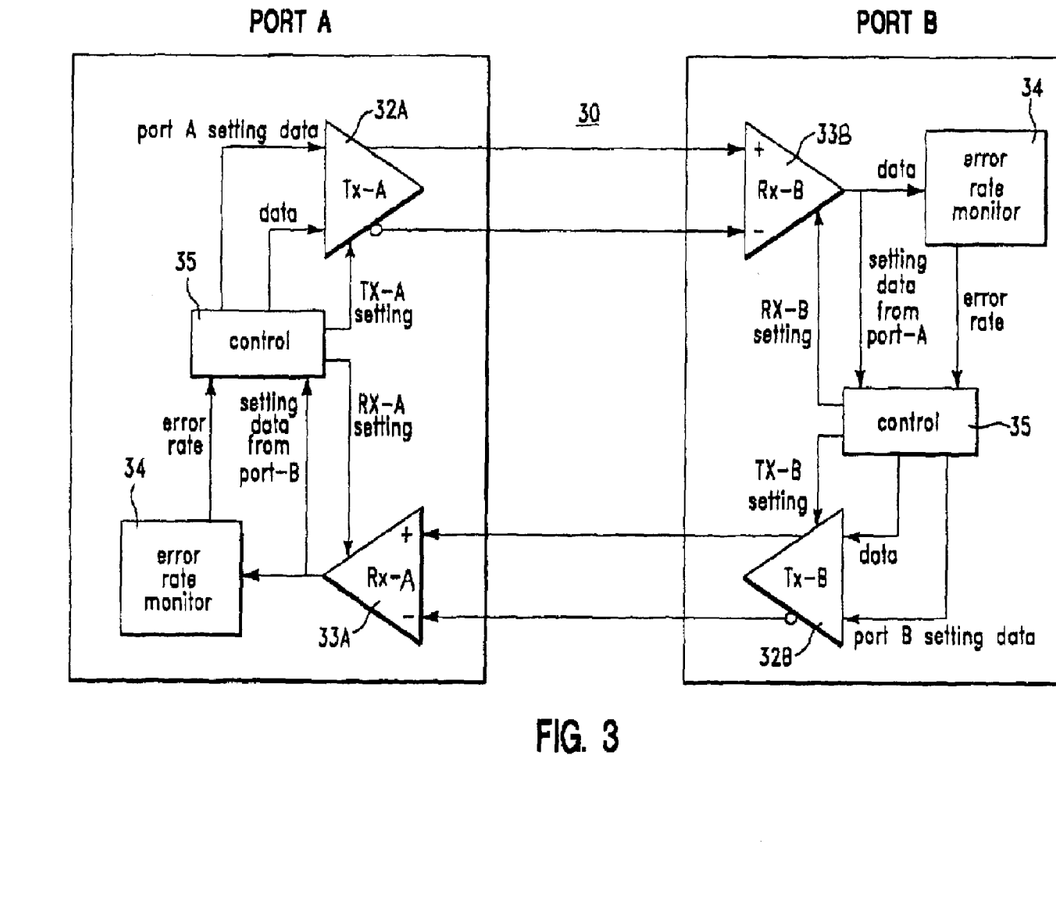
FIG. 3 illustrates a system embodiment of the invention.

As shown in FIG. 3, in an embodiment of the invention, a system is provided in which power levels of a receiver and a transmitter of a duplex communication link 30 are adjustable automatically, in order to optimize the bit error rate. As shown, a duplex communication link 30 is provided as a pair of one-way links between a pair of ports, port A and port B. Each port includes components that control and monitor link communication parameters. Thus, each port includes at least a control block 35 and a bit error rate (hereinafter BER) monitor 34. In addition, each port (port A or port B) also includes at least one transmitter, e.g. TX 32A, and at least one receiver, e.g. RX 33A of port A.

In each port, e.g. Port A, the receiver 33A is in electronic communication with both the BER monitor 34 and the control block 35, as shown in FIG. 3. The BER monitor 34 is also connected to the control block 35 in each port, as shown. In addition, the control block 35 in each port is electrically connected to the transmitter, for example TX 32A in the case of port A. Control block 35 and BER monitor 34 control operation during a power calibration sequence, and determine the bit error rate at intervals thereof, respectively. During a power calibration sequence, control block 35 of port A controls the providing of a test data pattern to a transmitter TX 32A, in order that the data signal transmitted over link 30 to a receiver RX 33B can be checked for errors by BER monitor 34. For this purpose, for example, control block 35 can include a pseudo-random bit sequence (PRBS) generator for generating a predictable bit pattern. At port B, the BER monitor 34 can include a PRBS generator of the same construction to generate the same predictable bit pattern, which can then be used to check the accuracy of the data bit pattern received by receiver RX 33B over link 30.

Control block 35 and BER monitor 34 operate during a power calibration operation. During normal operation in which link 30 is used for communication of ordinary data signals, it will be understood that control block 35 and BER monitor 34 need not intervene. During such power calibration operation to adjust transmitter and receiver power levels, a control block 35 of port A causes a test data signal pattern to be transmitted by transmitter 32A over link 30 to receiver 33B. At the receiving port (port B), the data signal pattern is processed in the following manner. The data signal pattern received by the receiver 33B of port B is output to the BER monitor 34. The BER monitor 34 then checks the accuracy of the received data signal pattern and outputs an error rate signal to the control block 35. Based on the results determined by the BER monitor 34, the control block 35 provides control input to transmitter 32B, and/or to receiver 33B, including one or more power level settings to transmitter 32B as a TX-B setting in FIG. 3 and to the receiver 33B as an RX-B setting. In addition, the control block 35 of port B may provide port setting data to be transmitted to control block 35 of port A through receiver 33A, for use in setting transmitter and/or receiver power levels of port A. Similarly, control block 35 of port B causes a test data signal pattern to be transmitted by transmitter 32B over link 30 to the receiver 33A of port A. Such test data pattern signal, in turn, is processed internally at port A in a manner such as that described above for port B.

Both the transmitter TX 32A and the receiver RX 33A of a port (port A) have adjustable power settings, as illustrated in FIG. 3. The adjustable power settings enable power levels of the transmitter and the receiver to be calibrated for a port pair (TX 32A and RX 33A) of a network system. Considering a one-way link in isolation, for example, the link between TX 32A of port A and RX 33B of port B, it is possible that high power settings may result in a better performance. For adjacent links, however, such as those in the same port, for example, the transmitting link from TX 32A and the receiving link into RX 33A, a higher power setting for either TX 32A or RX 33A may generate higher cross coupling interference, leading to decreased performance. While the adjustable transmitter and receiver power settings are illustrated only generally in FIG. 3, a more detailed description of their implementation follows.

Figure 4:
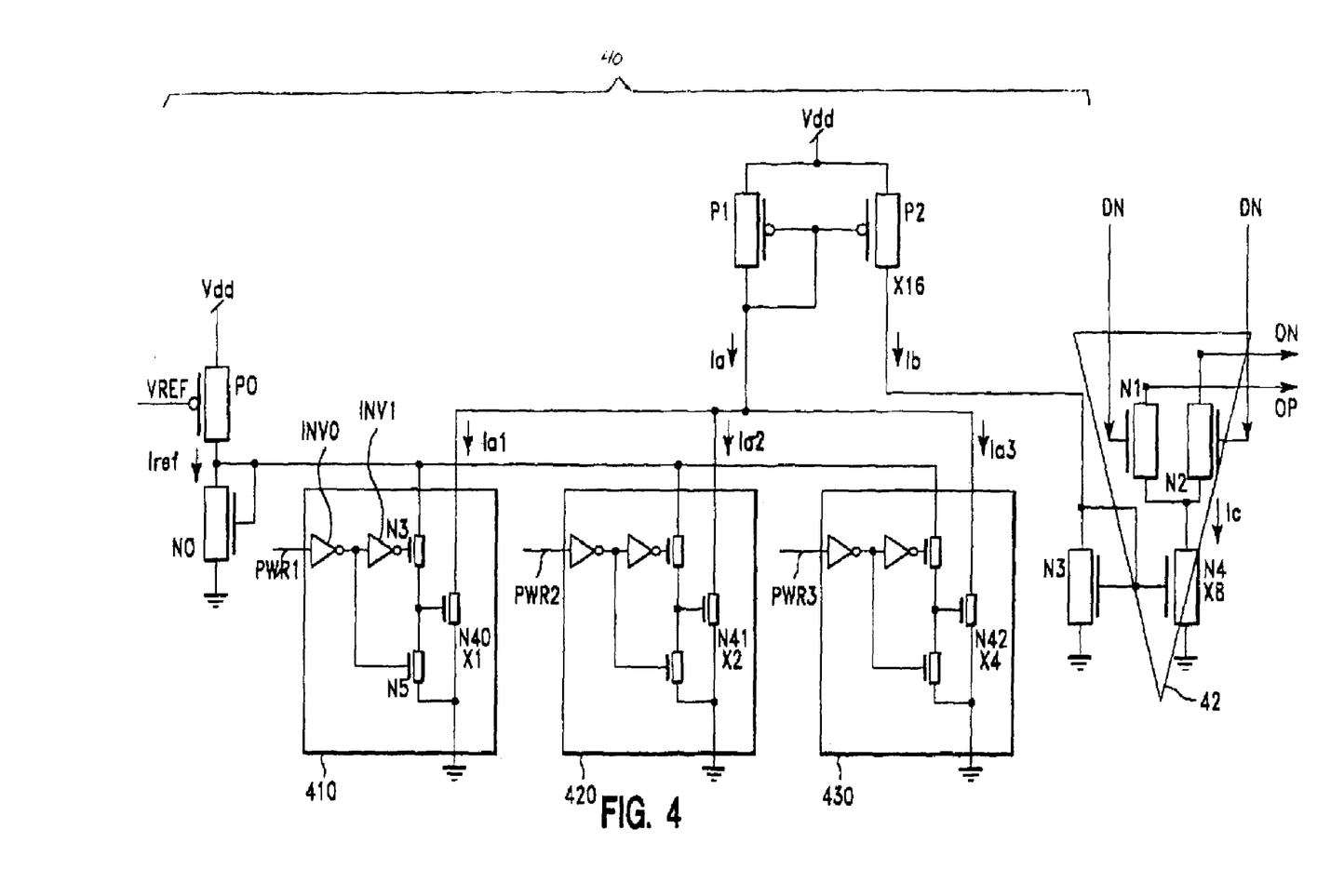
FIG. 4 is a circuit schematic illustrating a system for setting a power level of a signal driver.

FIG. 4 illustrates an embodiment of a signal driver 42 of a transmitter having adjustable power settings, as described above relative to FIG. 3. The signal power output at nodes ON and OP is controlled by the magnitude of the current used by a current mode differential driver, controlled by a power control circuit 40, as discussed below. Transmitter, e.g. TX 32A, can be implemented by the combination of a power control circuit 40 and a signal driver 42.

The power control circuit 40 utilizes current mirroring to generate a current to power the driver 42 at a selected power level. The power control circuit 40 includes a current mirror circuit, formed by the transistor pair P0 and N0 that conducts a steady current "Iref", and a set of current mirroring blocks 410, 420, 430, selectable through signals PWR1, PWR2, PWR3, to conduct a combined current Ia at one of several selectable levels. Transistors P0 and N0 are preferably a p-type field effect transistor (PFET) and an n-type field effect transistor (NFET), respectively. It will be understood that more or fewer current-mirroring blocks can be used to attain desired power and current values, depending on particular needs and implementation.

As shown, each current mirroring block 410, 420, and 430 comprises three NFETs and two inverters. For example, current mirroring block 410 includes three NFETs N3, N40, and N5. A select signal PWR1 is input to a pair of back-to-back inverters INV0 and INV1. In each current mirroring block 410, 420, 430, one NFET N40, N41, or N42, respectively, operates as a tail device for generating a current Ia1, Ia2, or Ia3, respectively, at a multiple of the reference current Iref. Each tail device N40, N41, or N42 is sized to conduct a different multiple of the reference current Iref. For example, tail devices N40, N41, and N42 can be arranged to conduct currents Ia1, Ia2, and Ia3, respectively, in the ratio X:2X:4X relative to each other. The smallest current Ia1 can be generated either in the same magnitude as Iref, or, preferably as a multiple of Iref. In such case, the ratio of the relative device sizes of tail devices N40:N41:N42 is adjusted to be 1X:2X:4X. Assuming an example in which Ia1 is equal to Iref, then Ia2=2X Iref and Ia3=4X Iref. Consequently, the total current Ia when all blocks 410, 420, and 430 are selected and on, in this example, will equal Ia1+Ia2+Ia3, i.e. 7X Iref. Thus, with the select signals PWR1, etc., different current levels may be achieved in increments of Iref, the reference current. In the example herein, there are 8 different current levels, but more or less levels can be provided in different arrangements, as will be understood.

The combined current Ia of current mirroring blocks 410, 420, 430 is mirrored to a driver control current Ib through a driver load device P2. The driver control current Ib determines the signal amplitude of driver outputs ON and OP. The value of Ib, however, is based on a set multiple of the value of Ia. In an illustrative example, the preset multiplication factor for the driver load device P2 is 16. Therefore, the amount of input current Ib to the driver 42 is a multiple (16 times) of the programmable current Ia. In the driver 42, the current Ib is again multiplied by a factor of eight, via the tail device N4 to produce a tail current Ic. Consequently, when the Iref current is set to a value of 25 uA, and if all the signals PWR1, PWR2, PWR3 are set to high, then:

$Ia = 7 \times 25$ uA, i.e. 175 uA;

$Ib = 16 \times Ia$, i.e. 2.8 mA; and $Ic = 8 \times Ib$, i.e. 22.4 mA.

Therefore, the driver 42 can have a tail current Ic of up to 22.4 mA. By setting the current mirroring blocks 410, 420, 430 in this way one can get a range of driver currents namely: 0 mA, 3.2 mA, 6.4 mA, 9.6 mA, 12.8 mA, 16.0 mA, 19.2 mA or 22.4 mA, as desired. Increased tail current Ic in driver 42 increases the amplitude of transmitted output signals ON and OP and their drive strength; conversely, reduced tail current Ic reduces the amplitude and drive strength of the output signals ON and OP.

Referring back to FIG. 3, the power level of the receiver 33A is made adjustable to assure that the received signals are sufficiently high to overcome the noise signal. An equalization device such as a finite impulse response (FIR) filter, an IC peaking pre-amp, or a variety of other such devices as known to those skilled in the art can be implemented in the receiver 33A to compensate for signal loss due to noise or attenuation effects. Details of such mechanisms are beyond the scope of the present method and system. However, it will be understood that over equalizing leads to higher power consumption and higher coupling noise to nearby links, and thus is not desirable and should be avoided. Having described implementations for transmitters and receivers having adjustable power settings, calibration methods will now be described relative to FIGS. 5 through 8.

Figure 5:
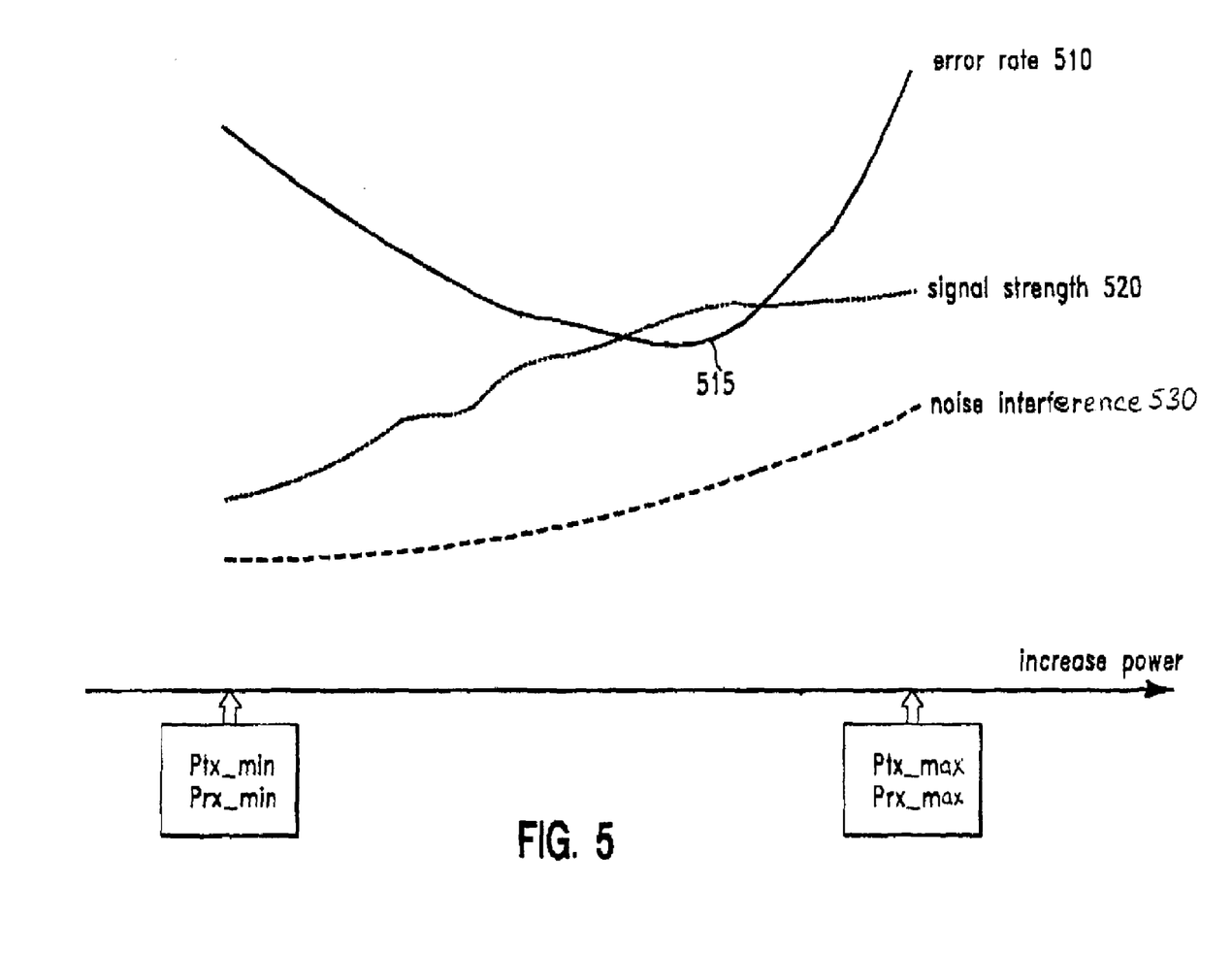
FIG. 5 is a graph illustrating relationships between noise, signal strength and bit error rate.

FIG. 5 graphically illustrates relationships between signal strength, noise interference and the bit error rate (BER) of a communication system having a transmitter TX and a receiver RX. Separate curves are shown for the bit error rate (BER) 510, signal strength 520 and noise interference 530, as functions of power. Signal strength 520, representing TX driver strength (and/or RX receiving sensitivity, alternatively) and noise interference 530 monotonically increase in relation to an increase in the TX/RX power level. The overall system error rate, however, has a minimum value for an intermediate power setting, as represented by a dip 515 in the bit error rate curve 510. The dip 515 indicates an optimal power setting, also known as an optimization point. Optimization points for different embodiments and settings are reached by following one or more of the methods shown and described below with reference to FIGS. 7 and 8.

Figure 6:
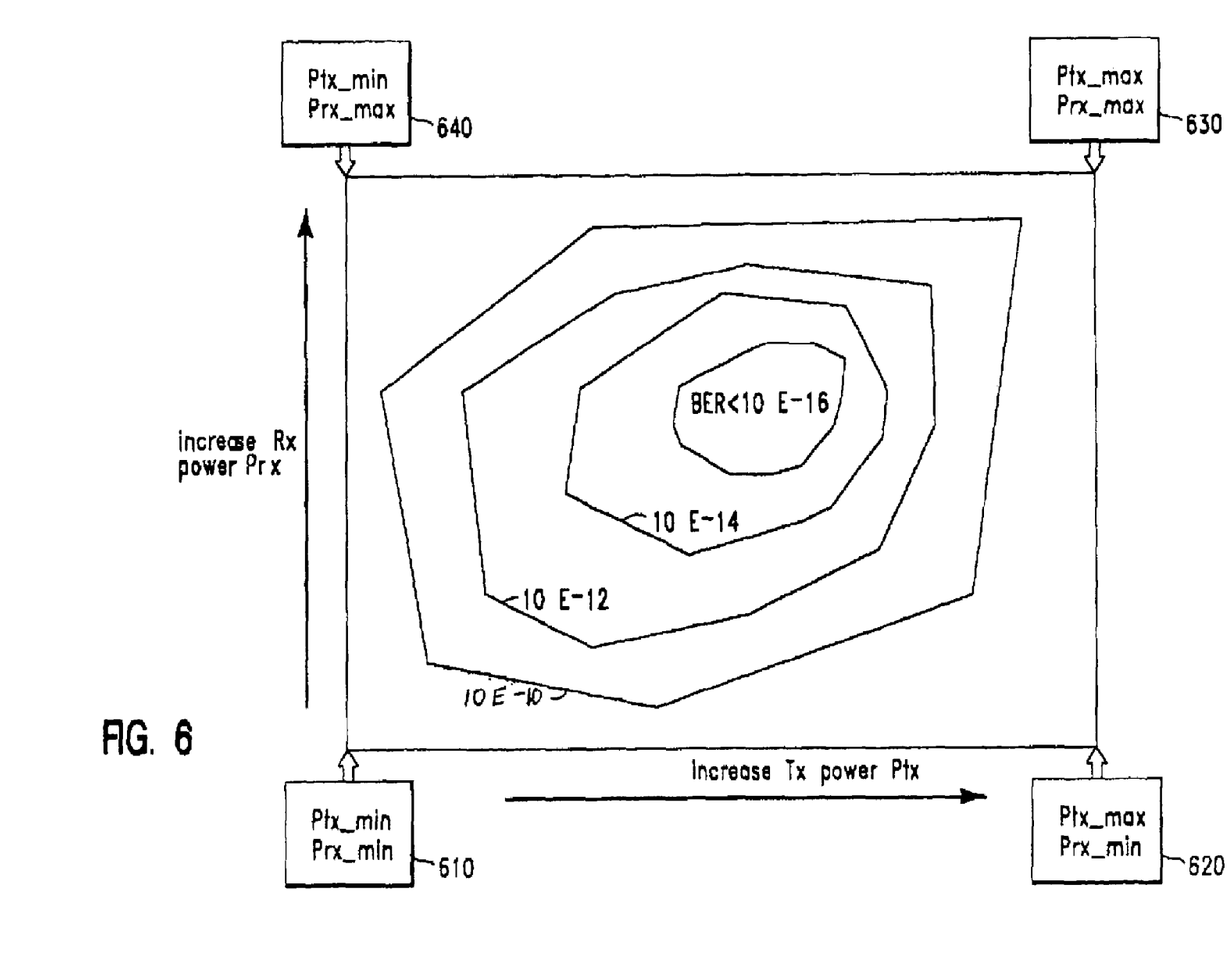
FIG. 6 is a graph illustrating a relationship between bit error rate as a function of power levels of a transmitter and a receiver.

FIG. 6 is a two dimensional graph illustrating relationships between transmitter and receiver power levels and resulting bit error rate (BER). An understanding of this graph is essential to understanding the calibration methods to follow. The four corner points in the graph are represented by minimum transmitter and receiver power (Ptx_min, Prx_min) shown at (610), maximum transmitter and receiver power (Ptx_max, Prx_max) shown at (630) and the other combinations (Ptx_max, Prx_min) shown at (620), and (Ptx_min, Prx_max) shown at (640). The BER value can be graphically viewed as a function of transmitter power, receiver power, or both, as illustrated.

In a two-dimensional vector representing a possible power setting such as that depicted in FIG. 6, P (power) can be expressed as:

$P = (Ptx, Prx)$

Ptx and Prx are representative of the power levels of the transmitter (TX) and the receiver (RX), respectively. The total power for the system, represented as Ptotal, can then be represented as the sum of the Tx power (Ptx) and the Rx power (Prx) for particular settings.

A specific method can now be employed to determine and reach an optimization point. The optimization point for the lowest total power Ptotal that achieves a pre-determined BER level can be expressed as:

$P \min Ptotal(P) = Ptx + Prx$, subject to $BER_{total} \leq BER0$ \hfill (I)

where BER0 is a predetermined system bit error rate requirement. The condition in equation (I) can be reached using the method illustrated in the flowchart of FIG. 7.

Figure 7:
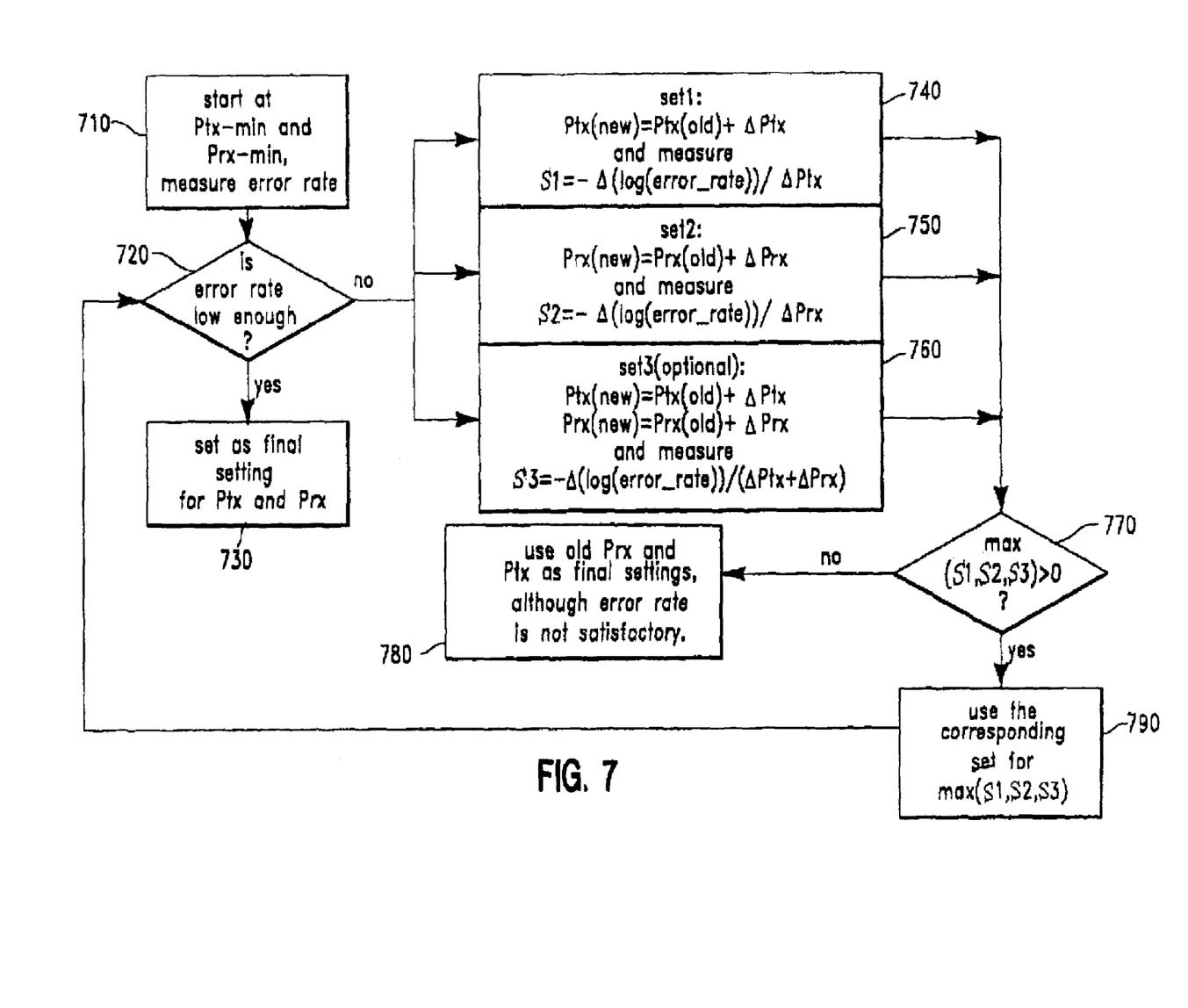
FIG. 7 is a flowchart illustrating a method to determine optimized power levels in an embodiment having a pre-set bit error rate target.

In the flowchart of FIG. 7, a method is shown for adjusting transmitter and receiver power levels until a target bit error rate BER0 is reached. In the first flowchart block 710, the power level for both TX) and RX are set to their minimum value. The value of BER is then measured for the system at this level. As indicated by the decision block 720 that follows, if the resulting (measured) BER is found to be smaller than BER0, then Ptx_min and Prx_min represent the optimized settings for the system, and these power settings are then established at block 730 as the final settings for Ptx and Prx.

If the other branch of flowchart of FIG. 7 is followed, however, when the resulting BER value is determined, in block 720, to be greater than BER0, different TX and RX power settings are tested in order to reach the optimization point. In such cases, the TX and/or RX power levels must be increased and the effect on the BER then measured again after such increase. Because of the different effects on BER of increasing the transmitter and receiver power levels, BER is preferably measured in three different ways to establish the optimization point; The three algorithms used in blocks 740, 750, and 760 of FIG. 7 for evaluating changes in BER after altering TX and RX power settings are indicated below:

$Ptx(\text{new}) = Ptx(\text{old}) + \Delta Ptx$; and measure $S1 = -\Delta (\log(\text{error\_rate}))/\Delta Ptx$; \hfill (1)

$Prx(\text{new}) = Prx(\text{old}) + \Delta Prx$; and measure $S2 = -\Delta(\log(\text{error\_rate}))/\Delta Prx$; \hfill (2)

(optional) $Ptx(\text{new}) = Ptx(\text{old}) + \Delta Ptx$, $Prx(\text{new}) = Prx(\text{old}) + \Delta Prx$, and measure (3)

$$S3 = -\Delta(\log(\text{error\_rate}))/(\Delta Ptx + \Delta Prx).$$

In the above algorithms (1) through (3), Δ represents a positive increment in value. S1, S2, and S3 are the measured sensitivity of the bit error rate to change in TX and/or RX power level(s).

At decision block 770, the maximum value of S1, S2 and S3, i.e. max(S1, S2, S3) is checked and compared to zero. If max(S1, S2, S3)>0, then there is an improvement of system BER, and the power levels Ptx, Prx corresponding to max (S1, S2, S3) will be used (block 790). The resulting new BER will again be compared to BER0, as shown in decision block 720. However, in the case where max (S1, S2, S3)<0, since no improvement is found, the old power settings are used as the final settings, although the system BER is not satisfactory, as shown at block 780 in the flow chart.

This iterative process of checking BER for different power settings continues until the target value BER0 is reached, or no further improvement is found. If an error rate is attained that is smaller than BER0, the decision at block 720 will be "yes" and then the corresponding Ptx and Prx settings will be used (block 730) as the final values for a transmitter 32A and receiver 33A pair of a port, e.g. port A. Such settings will then be applied to transmitter and receiver, for example, to a signal driver 42 of a transmitter through a power control circuit 40, such as that described above relative to FIG. 4.

When the BER is not smaller than BER0, the "no" branch of decision block 720 is followed again, and the corresponding power levels will be increased, again, in blocks (740), (750) and (760). The results will again be tested in decision block (770), and operation continues, as described above, until final power settings are determined.

It should be noted, however, that there may not always be a pre-determined target for the bit error rate (BER). In such situations, where there is no predetermined BER value; BER will have a global minimum value for any power level setting, as represented by Equation (II) below:

$$P \text{ solves min } BER(P) \tag{II}$$

Figure 8:
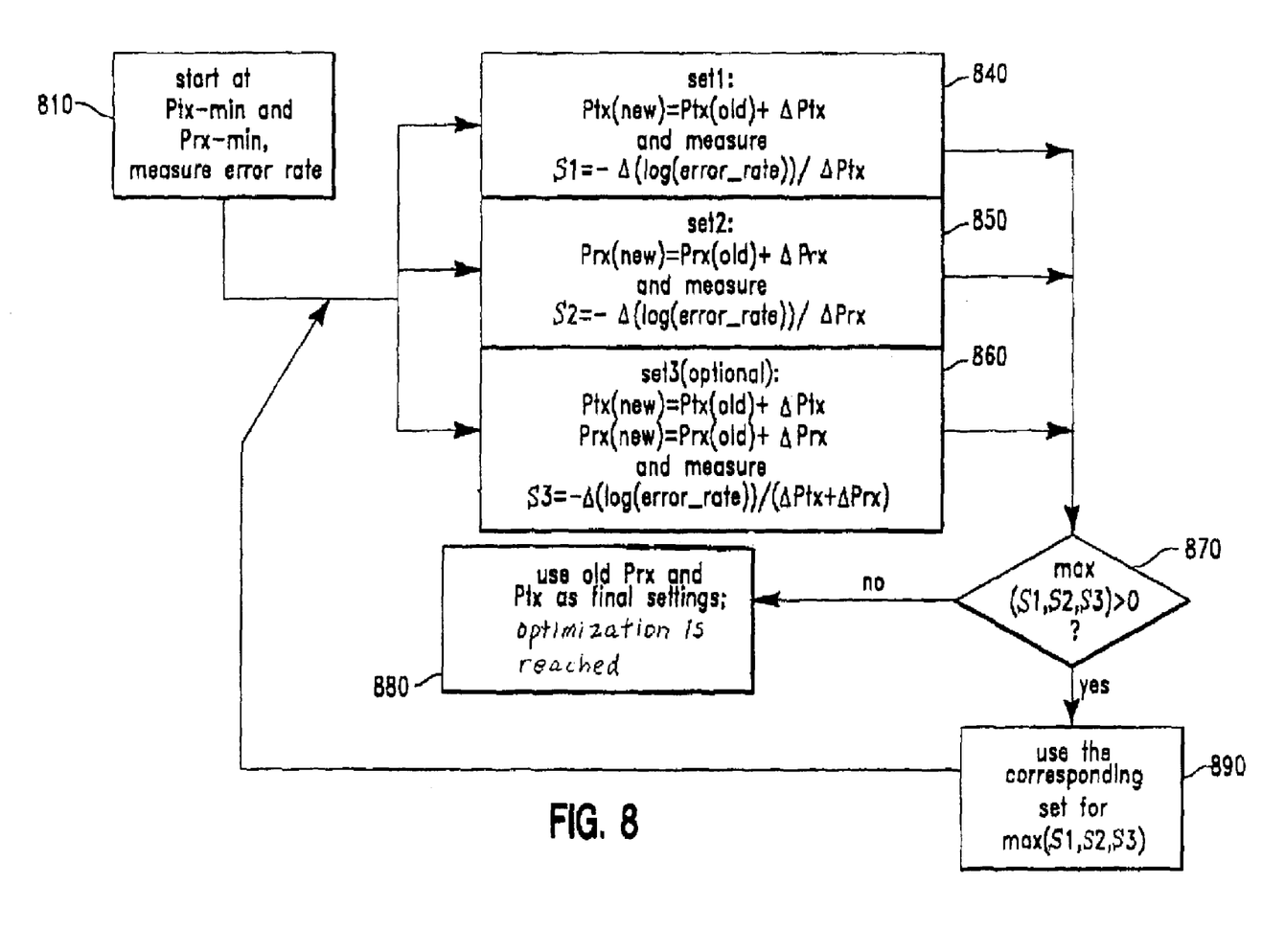
FIG. 8 is a flowchart illustrating a method to determine optimized power levels in an embodiment that seeks a global minimum bit error rate.

A solution for Equation (II) can be achieved by using the method illustrated in FIG. 8. The method shown in FIG. 8 is similar to that shown in FIG. 7, except for the method now seeking a global minimum BER value instead of a predetermined BER value. In this method, the power levels for the transmitter (TX) and the receiver (RX) are set to their minimum, as represented by Ptx_min and Prx_min, as shown at block 810. A baseline measurement of BER is made. Then, the power levels are increased, according to three different conditions, and calculations are made using the same three algorithms as before. Note that the blocks 840, 850 and 860 in FIG. 8 correspond to similarly numbered blocks 740, 750 and 760 in FIG. 7. In block 870, the maximum value of S1, S2 and S3, i.e. max(S1, S2, S3), is compared to zero, to determine if results have improved.

In the case where max(S1, S2, S3)<0, no improvement in results is seen from blocks 840, 850 and 860. Therefore, optimization is determined to have been reached. In such case, the old power settings are used as the final settings for transmitter and receiver power. This is shown at block 880 of the flowchart. If, however, max(S1, S2, S3)>0, then the corresponding improved power settings will be used (block 890). Like the method described above relative to FIG. 7, a new set of power settings are then tested again, when the method loops back around to blocks 840, 850 and 860 again, each time increasing the power incrementally and then testing the resultant BER, until optimized settings are ultimately reached.

In an alternative embodiment of the present invention, maximum power settings, instead of minimum power settings, can be used to initialize the transmitter and receiver at the beginning (i.e. block 810) of the method. Thus, such method will begin at the settings Ptx_max and Prx_max, followed by incremental decreases in the power level and testing of the BER to reach the optimization point. The principle of this alternative embodiment can be best understood by referring back to FIG. 5, in which the dip 515 in the BER value 510 appears between the maximum and minimum power values, so that it can be reached from either direction of the curve, by either an increase or decrease in power.

Now that both calibration methods and systems for implementing adjustable transmitter and receiver power settings have been described as provided herein, an additional practical challenge must be addressed. Referring again to FIG. 3, the control block 35 and BER monitor 34 can be implemented as logic blocks on an integrated circuit chip. However, if the BER value is very low, measurements having very long time durations may be required, making any such implementation impractical or cost prohibitive. This concept can best be understood in the following example.

At a data rate of 5 Gbits/sec, a BER of $10^{-8}$ corresponds to one bit error for every 20 milliseconds. However, at the same data rate of 5 Gbits/sec, a BER of $10^{-16}$ corresponds to only one error bit for every $2 \times 10^6$ seconds, that is only about one bit error in every 23 days. As will be apparent, it is not practical to directly measure such a low BER to test for and determine adjustments to be made to the communication system.

Figure 9A:
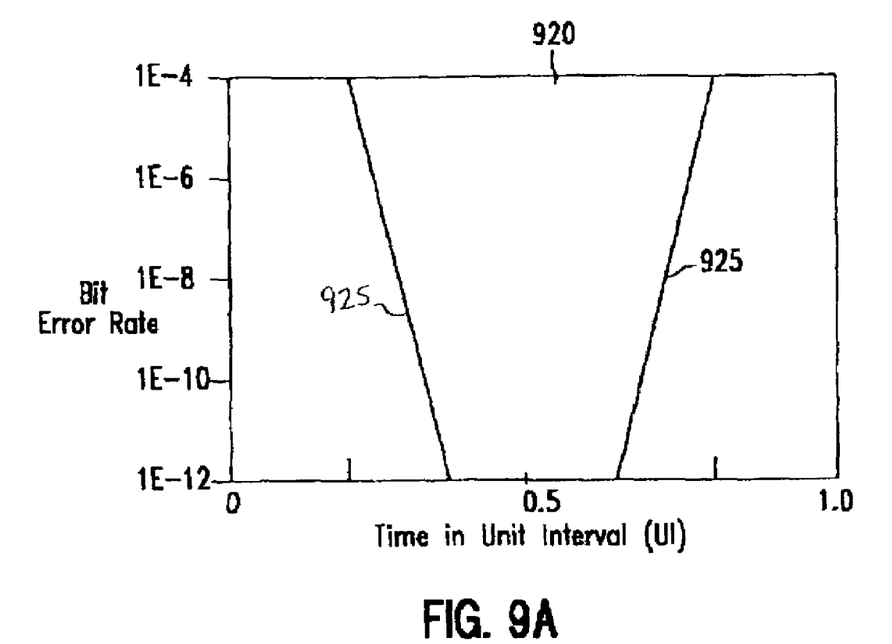
FIG. 9A is a graph illustrating a bit error rate of received data as a function of clock timing phase.
Figure 9B:
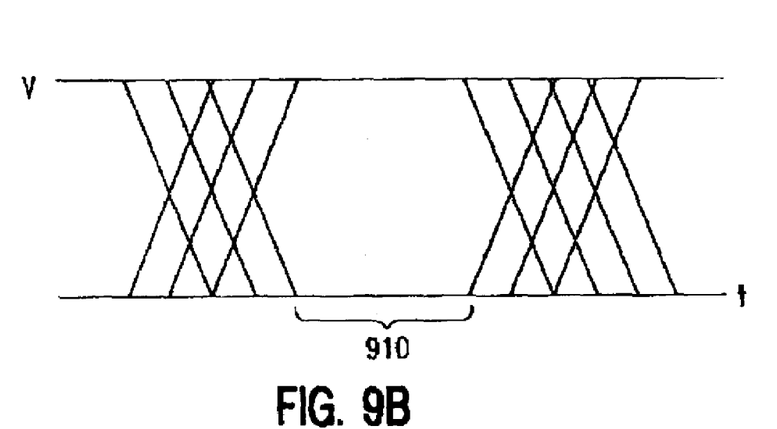
FIG. 9B is an eye diagram illustrating a data signal at an input to a receiver.

To address and resolve this problem, in the present embodiments, another method of measuring a very low BER is used, using the well-known "bathtub" curve, known to those skilled in the art. First, the relationship between BER and "an eye opening" in a timing diagram will be described, as shown in FIGS. 9A and 9B. FIG. 9A illustrates the well-known "bath-tub" curve. Typically, BER is determined in relation to the "eye opening" of a given signal. FIG. 9B is a timing diagram illustrating such an "eye opening" 910. The eye opening represents the time interval between rising and falling edges of a digital signal, as narrowed by jitter, attenuation, or other noise and interference that occurs over a period of time.

Referring to FIG. 9A, the bit error rate is shown as a function of timing accuracy within the eye opening of the signal to be received. The area 920 is centered on the eye opening. As apparent from lines 925 in FIG. 9A, the bit error rate increases exponentially, the farther away (in units of time) from the center (the 0.5 point) of the unit time interval, i.e. from the center of the eye opening, that the received signal is clocked. Thus, if the clock used for receiving a transmitted data signal is moved closer to the edge of the eye opening, that is, upwards along either of lines 925, a higher bit error rate is forced to result. The present invention takes advantage of a higher BER, thus forced, to test and track different power settings for RX and TX, with the higher BER under such condition serving as a proxy for a lower BER that will be achieved in normal operation, when the clock edge is moved back to the center of the eye opening.

First, it is necessary to describe how the timing of a data clock provided to a receiver is ordinarily determined. In a preferred implementation, clock detection and recovery (CDR) circuits are used to generate a data clock with a triggering edge (e.g. rising edge of the clock) that is aligned at the center (the 0.5 point) of the data eye opening. This is accomplished through a two-step process. First, a timing feedback loop, locked on the edge of the data transition, is used to generate an edge clock. The data clock is then generated and is set 180 degrees apart from the phase of the edge clock. It will be understood that during normal operation, the data clock, which is a zero degree clock used to latch the input data, is adjusted to the center of the eye opening of the incoming data. This allows for the achievement of a very low targeted BER value such as $10^{-16}$.

Next are described steps that are performed to change the data clock timing, in order to facilitate the BER monitoring of the power calibration methods described above relative to FIGS. 7 and 8. While the edge clock is maintained in synchronization with the edges of the data signal, a fixed offset is now added to the data clock relative to the edge clock, so that the phase of the data clock is moved away from the center of the data signal, i.e. moved away from its normal center at the phase of the edge clock minus 180 degrees. The offset can be either positive or negative, and can be achieved using one of several techniques, such as using a delay element in a phased locked loop (PLL). In such way, the data latching point is moved away from the center of the eye opening and the measured BER is increased exponentially to a point, for example, from $10^{-16}$ to $10^{-8}$, at which the effects of changing transmitter and receiver power levels on the BER can be understood in a relatively short period of time. By shifting the data clock to permit measurements at exponentially higher BER levels, and utilizing the methods described above relative to FIG. 7 or 8, it is shown to achieve optimized TX and RX power settings relative to measured BER with relatively short duration measurements of BER. Finally, after determining optimum power levels for operating the transmitter and receiver of a particular pair (e.g. TX 32A and RX 33A of port A), the data clock can then be moved back to the center of the eye opening, when the transmitter and receiver pair is placed in normal operation.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. In a communication system having a plurality of duplex communication links between a plurality of transmitters and receivers, a method of setting a power level of a transmitter coupled to an outgoing link at one end of one of said duplex communication links and setting a power level of a receiver coupled to an incoming link at said one end of said one duplex communication link to optimize a bit error rate for said receiver to receive transmissions from said incoming link, comprising:

a) initializing power levels of said transmitter and said receiver at said one end of said duplex communication link;

b) determining said bit error rate for said receiver to receive transmissions from said incoming link;

c) increasing said power level of said transmitter to an increased transmitter power level and determining whether said bit error rate improves;

d) setting said power level of said transmitter to said increased transmitter power level when said bit error rate improves;

e) increasing said power level of said receiver to an increased receiver power level independently from step c) of increasing said transmitter power level and determining whether said bit error rate improves;

f) setting said power level of said receiver to said increased receiver power level when said bit error rate improves;

g) determining whether said power levels of said transmitter and said receiver are set at which said bit error rate is optimized and if not, repeating said steps c), d), e) and f).

2. The method of claim 1 wherein said bit error rate is optimized when said bit error rate does at least one of i) falls below a target value; or ii) fails to show improvement after said steps c) through f).

3. The method of claim 1 wherein said bit error rate is optimized when said bit error rate fails to show improvement after said steps c) through f).

4. The method of claim 1, further comprising the steps of h) decreasing said power level of said transmitter to a decreased transmitter cower level and determining whether said bit error rate improves;

i) setting said power level of said transmitter to said decreased transmitter power level when said bit error rate improves;

j) decreasing said power level of said receiver to a decreased receiver power level and determining whether said bit error rate improves; and k) setting said power level of said receiver to said decreased receiver power level when said bit error rate improves.

5. The method of claim 1 wherein said transmitter power level and said receiver power level are increased and set by signals which determine magnitudes of operating currents of said transmitter and said receiver.

6. The method of claim 5 wherein said signals are provided to select one or more currents from a plurality of selectable current mirroring blocks.

7. The method of claim 6 wherein said selectable current mirroring blocks produce said currents in different magnitudes.

8. In an integrated circuit having a plurality of transmitters and receivers for communicating over a plurality of duplex communication links, a system for setting power levels of a transmitter coupled to an outgoing link at one end of one of said duplex communication links and a receiver coupled to an incoming link at one end of said one duplex communication link to optimize a bit error rate for said receiver to receive transmissions from said incoming link, comprising:

a) a control block coupled to said transmitter and to said receiver of said pair, operable to set power levels of each of said transmitter and said receiver to a plurality of independently selectable settings; and b) an error rate monitor coupled to said receiver and to said control block operable to determine and report a bit error rate to said control block for a data signal received by said receiver from said incoming link, wherein said control block is operable to perform an action i) to increase said power level of said transmitter to an increased transmitter power level and determine whether said bit error rate improves, an action ii) to set said power level of said transmitter to said increased transmitter power level when said bit error rate improves, an action iii) to increase said power level of said receiver to an increased receiver power level independently from said action i) to increase said transmitter power level and determine whether said bit error rate improves, an action iv) to set said power level of said receiver to said increased receiver power level when said bit error rate improves and an action v) to determine whether said power levels of said transmitter and said receiver are set at which said bit error rate is optimized and if not, an action vi) to repeat said actions i) through.

9. The system of claim 8 wherein said control block is operable to determine that said bit error rate is optimized when said bit error rate does at least one of a) falls below a target value; or b) fails to show improvement.

10. The system of claim 8 wherein said control block is operable to determine whether an improvement results from at least one of said increased transmitter power level and said increased receiver power level based on said error rate monitor determining said bit error rate for conditions of increasing only said transmitter power level, increasing only said receiver power level, and increasing both said transmitter power level and said receiver power level.

11. The system of claim 8 wherein said control block is operable to initialize said transmitter power level and said receiver power level at minimum power levels.

12. The system of claim 8 wherein said control block is operable to initialize said transmitter power level and said receiver power level at maximum power levels.

13. The system of claim 8 wherein said control block is operable to set said transmitter power level and set said receiver power level by signals which control operating currents of said transmitter and said receiver.

14. The system of claim 13 wherein said control block provides said signals which control said operating currents to a plurality of selectable current mirroring blocks operable to produce a plurality of currents for combining as a selectable magnitude current.

15. The system of claim 14 wherein said selectable current mirroring blocks produce said plurality of currents in different magnitudes.

16. The system of claim 8 wherein said transmitter and said receiver are located next to each other on said integrated circuit and said control block is operable to determine said transmitter power level and said receiver power level to compensate for possible cross-coupled interference between said transmitter and said receiver.

17. The system of claim 8 wherein said control block is operable to shift a data clock provided to said receiver for receiving said data signal to a non-optimum phase, to purposely increase said bit error rate to allow said error rate monitor to determine relative changes in said increased bit error rate at said altered power levels.

18. The system of claim 17 wherein said data clock is shifted by control of a clock and data recovery circuit of said integrated circuit.

* * * * *